Oct. 19, 1954  F. R. McFARLAND  2,691,940
TRANSMISSION
Filed July 28, 1950  3 Sheets-Sheet 1
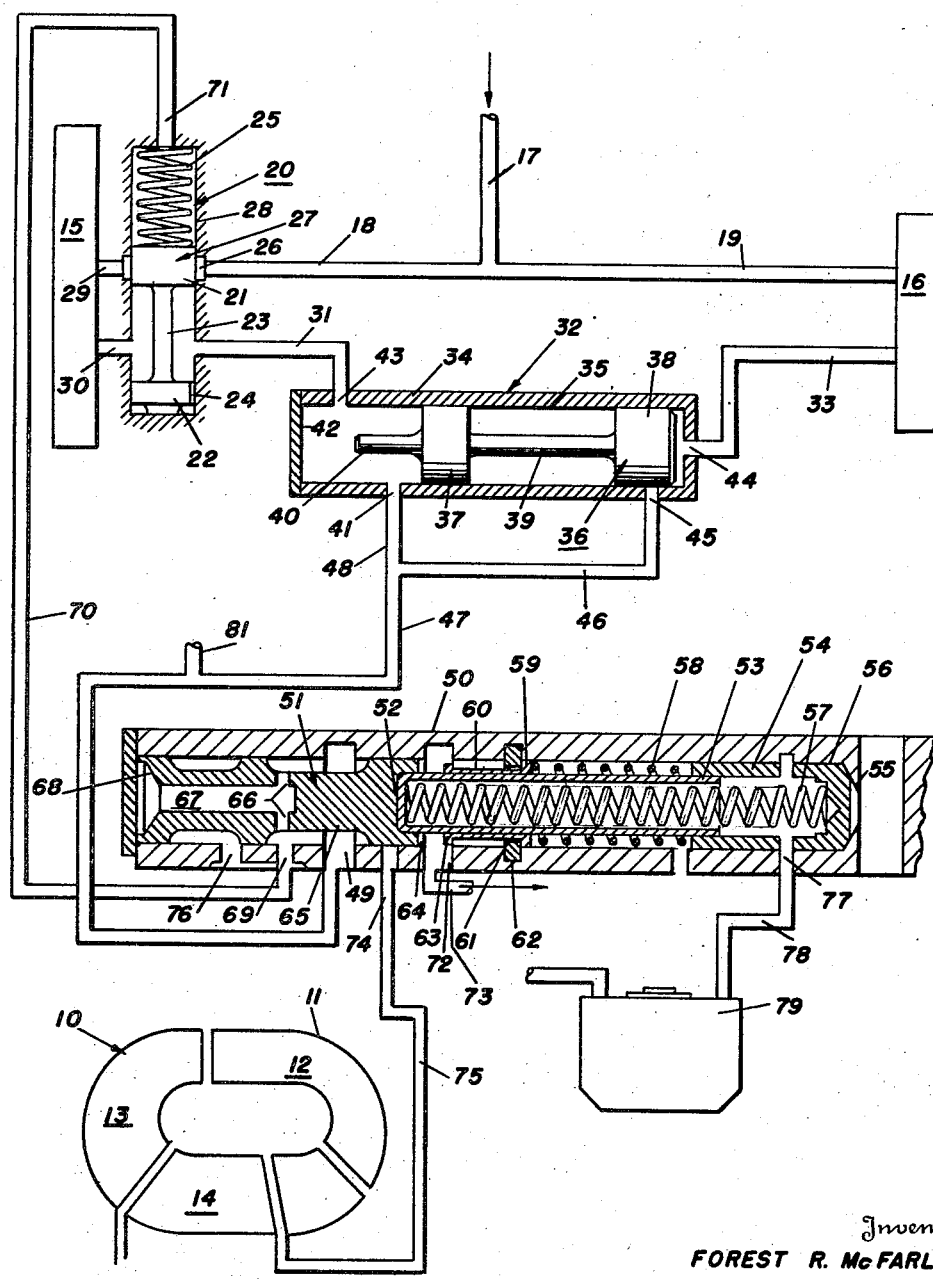
FIG_ 1
Inventor
FOREST R. McFARLAND

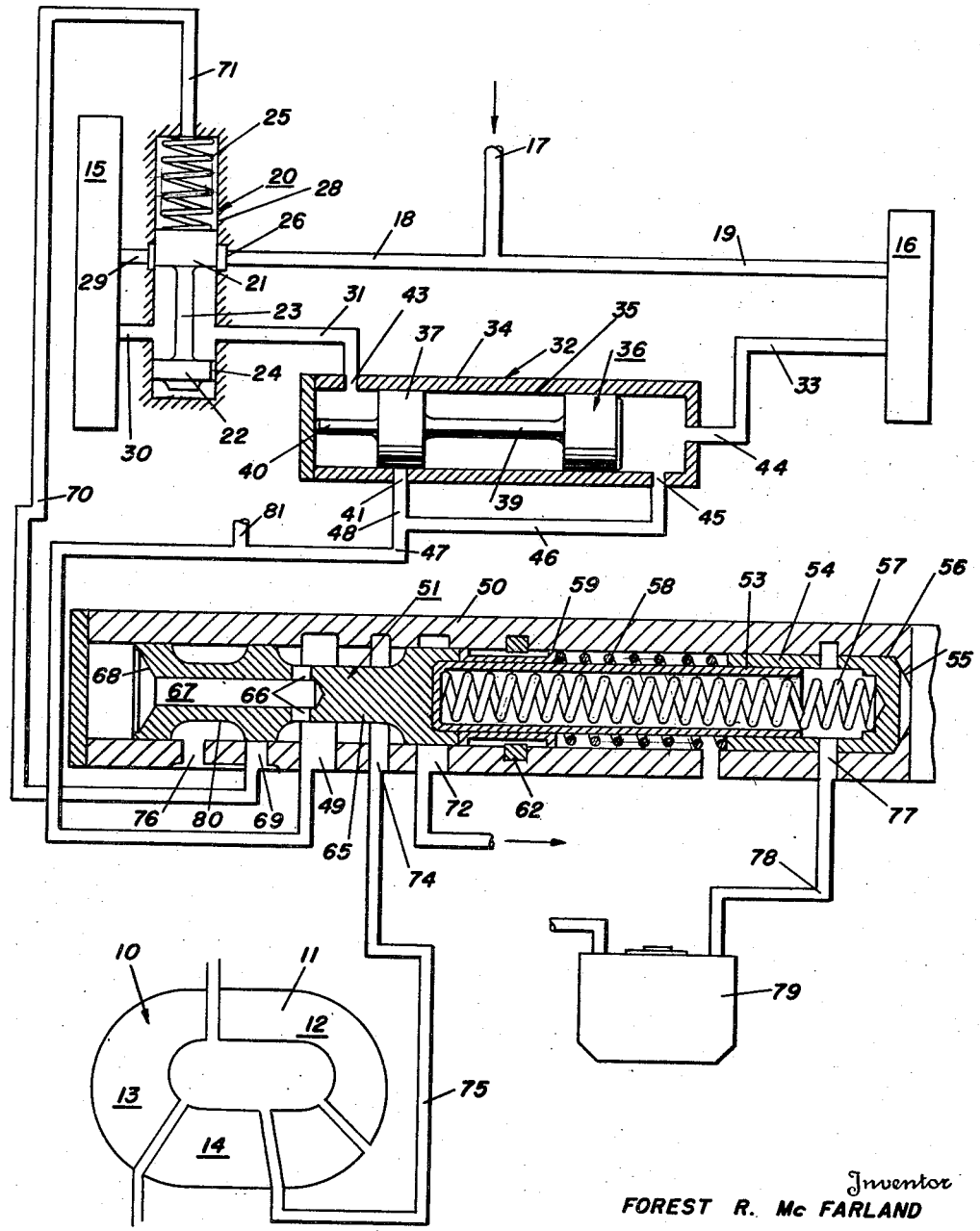
FIG_2

Oct. 19, 1954
F. R. McFARLAND
2,691,940
TRANSMISSION
Filed July 28, 1950
3 Sheets-Sheet 3
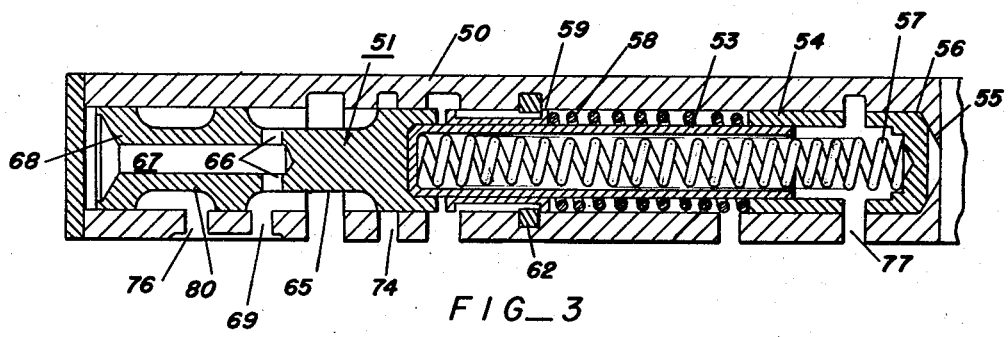
FIG_3
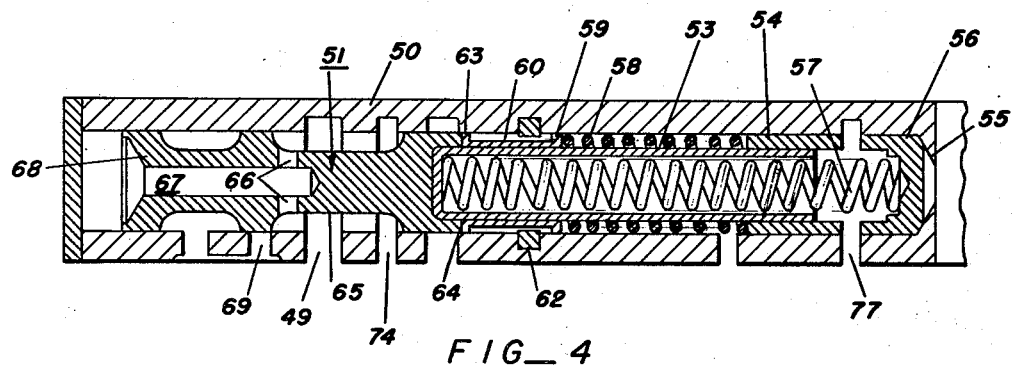
FIG_4
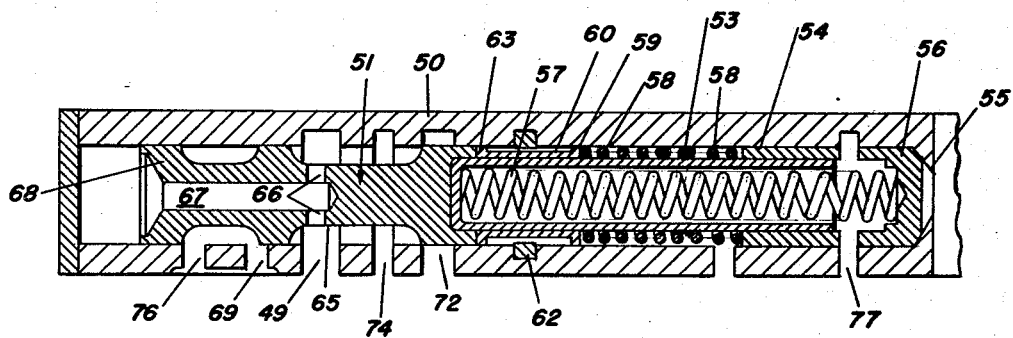
FIG_5
Inventor
FOREST R. McFARLAND
By Davis, Lindsey, Hibben + Noyes
Attorney Patented Oct. 19, 1954

2,691,940

UNITED STATES PATENT OFFICE 2,691,940

TRANSMISSION

Forest R. McFarland, Huntington Woods, Mich., assignor to Packard Motor Car Company, Detroit, Mich., a corporation of Michigan Application July 28, 1950, Serial No. 176,391

14 Claims. (Cl. 103—4)

This invention relates to a control for a hydraulically operated device, such as a variable speed power transmission for automotive vehicles. Such devices usually employ two pumps for supplying the fluid pressure needed to operate the transmission; one pump is connected to the engine at all times to supply fluid under pressure for starting the vehicle in motion, and the other pump is connected at all times to some member rotatable with the rear wheels, so as to supply fluid under pressure when the vehicle is moving. Since pump pressure will vary as a function of speed, the variation in pressure produced by the pump rotatable with the rear wheels is utilized to control changes in speed ratio or some other operation of the transmission. Each pump has to be of sufficient size and capacity to carry the load individually. When the vehicle is in motion, however, both pumps normally operate and since one is sufficient to carry the load, it is desirable to remove the other from the line, thereby economizing on the power required to operate the transmission.

One such transmission utilizing hydraulically operated clutches and brakes to effect speed ratio changes is disclosed in my co-pending application, Serial No. 71,128, filed January 15, 1949.

The transmission disclosed in the aforesaid co-pending application includes, in addition to hydraulically operated brakes and clutches, a hydrodynamic torque converter which for optimum efficiency must be filled with fluid under pressure while it is in operation. The pressure of the fluid in the converter is lower than the pressure required to operate the various clutches and brakes. Furthermore, in view of the different torque reactions handled by the brakes, different operating pressures must be available, for the brakes.

The principal object of this invention is to provide a hydraulic control system for a variable speed power transmitting device for an engine wherein the device is equipped with two pumps, the control system being adapted to select one of the pumps automatically under certain conditions for supplying fluid under pressure to the system, the other pump being operated at a reduced pressure at the time, so as to reduce the load on the engine.

A more specific object of this invention is to provide a pump selector valve for a hydraulic control system utilizing two pumps, said valve being adapted to assume a plurality of positions in accordance with the pressure developed by one of the pumps, the pressure, in turn, being a function of the speed at which the selected pump is driven.

A still more specific object of this invention is to provide a pump selector valve for a hydraulically operated device, utilizing two pumps, wherein means are provided for selecting one pump while reducing the output pressure of the other pump and then causing the valve to produce two different pressures consecutively from the operative pump; that is, the valve will produce a relatively low pressure until the operative pump reaches a predetermined speed of rotation at which point the pressure will be increased materially.

Another specific object of this invention is to provide a control system for a hydraulically operated power transmitting device, the latter having two pumps as a source of operating pressure, wherein a pump selector valve is utilized along with a check valve which blocks the output of one pump while the other is operating and with a vent valve for one pump, the valve being in part hydraulically balanced, the hydraulic balance, in turn, being controlled by the selector valve.

These and other objects of this invention will become apparent from the following detailed description when taken together with the accompanying drawings in which Fig. 1 is a schematic diagram of the hydraulic control system of a power transmission of the type shown in the aforesaid co-pending application, Serial No. 71,128, filed January 15, 1949. Said schematic diagram showing the novel pump selector valve and associated check valve and vent valve;

Fig. 2 is a schematic diagram of the hydraulic system and selector valve shown in Fig. 1, the valve and system being shown in the positions they assume when the valve has rendered one pump inoperative to supply fluid under pressure and has rendered the second pump effective; and, Figs. 3 to 5, inclusive, are sections taken through just the pump selector valve of Figs. 1 and 2, showing the valve in various stages of operation.

Before describing in detail the arrangement and operation of the parts of the system shown in the drawings, I wish it understood that the disclosure is merely illustrative of a preferred embodiment of this invention and that the invention may be applied to devices other than the transmission disclosed in the aforesaid co-pending application, Serial No. 71,128, filed January 15, 1949.

Referring now to the drawings for a detailed description of the invention and particularly to Fig. 1, there is shown schematically a hydraulic torque converter 10 comprised of a rotating container 11 to which are secured pump impeller blades 12 and within which are disposed a two stage turbine element 13 and a vaned reaction element 14, said two stage turbine element and vaned reaction element being sealed with the respect to container 11 to form a rotatable toroidal container. As shown in my co-pending application, Serial No. 71,128, housing 11 is connected to the engine so as to be rotatable therewith, while turbine element 13 is splined to an intermediate shaft which may be connected either directly or through gearing to a transmission output shaft from which the wheels of the vehicle are driven.

A pump 15, shown schematically as a rectangle, is driven directly from housing 11 and thus is driven whenever the engine is operating. Said pump 15 is preferably of the gear type, but any pump adapted to provide a positive displacement and hence a determinable fluid pressure may be used. A second pump 16 is driven from the output shaft of the transmission and is likewise preferably of the gear type. Pump 16 has materially less capacity than pump 15.

Fluid for the system is obtained through a conduit 17 from a central reservoir or sump and is fed through one branch 18 to pump 15 and through another branch 19 to pump 16. In branch 18 is disposed a pressure regulating valve 20 which is comprised of a plunger 21 having two lands, 21 and 22, connected by a stem 23 to form a peripheral groove 23. Land 22 has a small bleed opening 24 connecting both sides of the land. A spring 25 normally holds plunger 27 in the position shown in Fig. 1. In this position, land 21 bridges a groove 26 in bore 28, said groove 26 being connected to a passageway 29 which constitutes the inlet for pump 15. The outlet for pump 15 is shown at 30 and is alway aligned with the peripheral groove around the plunger which, in turn, is always aligned with a passageway 31 leading to a check valve 32.

Pump 16 is connected directly to branch 19 at all times, so that fluid from the sump is always available to said pump 16. The pump outlet is connected through a passageway 33 to the same check valve 32.

Check valve 32 is comprised of a valve body 34 having a bore 35 therein in which is slidable a valve plunger 36. Said plunger is comprised of two lands, 37 and 38, connected by a stem 39 which, with lands 37 and 38, forms a peripheral groove in plunger 36. A short stem 40 extends to the left of land 37, as viewed in Fig. 1 and is of a length to cause land 37 to close a port 41 in body 34 when said stem 40 abuts on the end wall 42 of valve body 34. Passageway 31 terminates in a port 43 which is located to the left of port 41, as viewed in Fig. 1, and is so spaced from end wall 42 that when stem 40 abuts on end wall 42, port 43 is not covered by land 37. This means that the left hand end of plunger 36, as viewed in Fig. 1 is always exposed to the pressure of the fluid in passageway 31.

Passageway 33 from pump 16 terminates in a port 44 in the right hand end wall, as shown in Fig. 1, of the valve body 34, and thus the right hand end of plunger 36, as viewed in Fig. 1, is always exposed to the pressure of the fluid in conduit 33.

It is apparent from the description of the valve plunger 36 and its associated passageways and ports that when the pressure in passageway 31 exceeds the pressure in passageway 33, plunger 36 will move to the right to the position shown in Fig. 1, and when the pressure in passageway 33 exceeds that in passageway 31, plunger 36 will move to the left until stem 40 strikes end wall 42.

A port 45 in valve block 34 is located near the right hand end of the block, as viewed in Fig. 2, such that land 38 covers port 45 in one extreme position of the plunger 36 and in the other extreme position uncovers port 45 to allow fluid from port 44 to pass out of the block. Port 45 is connected through a short passageway 46 to a pressure line 47, and port 41 is connected to a short passageway 48 to the same pressure line 47. Thus, check valve 36 is effective in one position to admit fluid under pressure from pump 15 to pressure line 47 while closing off the line leading to pump 16, and in its other position, closes off port 41 which, in turn, closes off the outlet of pump 15 and at the same time connects pump 16 to pressure line 47. This operation is automatic and is determined solely by the relative pressures produced by the two pumps 15 and 16 and transmitted to opposite sides of plunger 36. It is also a means for preventing the output of one pump from draining to the sump through the other pump.

Pressure line 47 is connected to a port 49 in a valve block 50 containing the pump selector valve for the system. Said valve is comprised of a plunger 51, having a recess 52 at one end in which is received a closed-end tube 53. Said tube is slidable in a short closed-end tube 54 which abuts on the end 55 of the bore 56 in which plunger 51 is slidable. A spring 57 is compressed between the closed end of tube 54 and the closed end of tube 53 so as to tend to separate the two. The net effect of this spring pressure is to urge plunger 51 to the left at all times.

Surrounding tube 53 is a second spring 58 which is compressed between the open end of tube 54 and the end 59 of a sleeve 60 which is slidable on the tube 53. Said sleeve 60 is of reduced diameter with respect to the end 59 so as to be slidable within a snap ring 61 retained in a groove 62 in valve block 50. Snap ring 61 limits the movement of sleeve 60 to the left as viewed in Fig. 1 which, in turn, limits the expanded height of spring 58. It is contempanded that spring 58 will be under compression when sleeve 60 rests against snap ring 61. The opposite end 63 of sleeve 60 is in the path of movement of the end 64 of plunger 51 so that as plunger 51 is moved to the right, as viewed in Fig. 1, it will strike the end 63 of sleeve 60 and will thereafter move against the resistance of spring 58, as transmitted to it by sleeve 60. Thus, plunger 51, in order to move to the right as viewed in Fig. 1, must first compress spring 57 until the plunger end 64 strikes end 63 of sleeve 60, and thereafter the plunger 51 must move against the combined resistance of springs 57 and 58.

Aligned with port 49 is a relatively wide peripheral groove 65 on plunger 51 which is connected by cross bores 66 in the plunger 51 to a central opening 67 leading to the left hand end 68 of plunger 51 as viewed in Fig. 1. Any fluid pressure existing in port 49 will also be present at the end 68 of plunger 51 and will tend to move plunger 51 to the right against the resistance of spring 57. Should the pressure in port 49 become great enough, plunger 51 will move until it strikes sleeve 60, and then will be held there until the pressure in port 49 increases to the value required to overcome both springs 57 and 58.

To one side of port 49 in block 50 is another port 69 which is connected through a conduit 70 and a port 71 located on the spring side of land 21 to bore 28 in valve 20. Fluid under pressure is conducted from port 49 through peripheral groove 65 to port 69 and thence through conduit 70 and port 71 to the spring side of land 21, thereby adding fluid pressure to the pressure of spring 25 to urge the plunger 27 toward the position shown in Fig. 1. The pressure of spring 25 and the fluid pressure will be opposed by pump pressure, acting upon the side of land 22 opposite stem 23, the fluid passing to said side through bleed opening 24. This pump pressure is initially established by the spring and is then increased by the pressure flow in line 71 from the selector valve 51. As will be shown later, the fluid pressure acting with spring 25 will vary and gradually decrease until it becomes substantially zero. When the fluid pressure disappears, all that opposes the outlet pressure of pump 15 is spring 25, and hence valve 27 will rise and uncover port 29 to dump the fluid back into the intake side of the pump until the fluid pressure is reduced to the spring pressure at which it will be stabilized.

Adjacent port 49 in block 50 is a relatively wide port 72 which is connected by means of a conduit 73 to the sump. Between ports 49 and 72 is a port 74 which is connected by means of a conduit 75 to the interior to torque converter 10. Adjacent port 69 is a port 76 which is connected by suitable means (not shown) to the sump. At the extreme right of value block 50, as viewed in Fig. 1, is a port 77 which is connected by means of a conduit 78 to a servo motor 79 which may be used to operate the reverse brake of the transmission.

The operation of the plunger 51, pumps 15 and 16 and associated apparatus described above will now be detailed.

The relative positions of the valves when the engine is inoperative and the vehicle is stationary is shown in Fig. 1. Under these conditions, neither pump 15 nor 16 is operating and, hence, there is no fluid pressure in the system. When the engine is started and the vehicle is standing still with the engine idling, pump 15 is operating and draws fluid from the sump through conduits 17 and 18, groove 26 and conduit 29 and discharges fluid at increased pressure through pump outlet 30 into the valve 20. From valve 20 the fluid under pressure passes through passageway 31 to check valve 32, and since pump 16 is not operating, a differential pressure will be established on the plunger 36 to move it toward the right, as viewed in Fig. 1, thereby causing land 38 to cover port 45 to prevent the dumping of the fluid through passageway 46, port 45, bore 35, port 44, and conduit 33 to pump 16.

The fluid will be conducted from check valve 32 through pressure line 47 and passageway 48 to port 49 in pump selector valve block 50. Springs 57 and 58 are unopposed at the moment and, hence, plunger 51 will be at its extreme left hand position as viewed in Fig. 1. In this position, peripheral groove 65 will be in communication with port 49 and also with port 69, thereby conducting fluid from pump 15 through conduit 70 and port 71 to the bore 28 of the front pump pressure regulating valve 20. The fluid pressure, thus, will be added to the spring pressure and hence the plunger 27 will remain in the position shown. Simultaneously, with the balancing of fluid pressure in pump pressure regulating valve 20, fluid under pressure will be conducted through cross bores 66 and axial bore 67 to the end 68 of plunger 51. This causes the fluid pressure to oppose the pressure of spring 57, and when the total fluid pressure exceeds the spring pressure, plunger 51 will move to the right, as viewed in Fig. 1.

Referring now to Fig. 3, the condition of the pump selector valve at its next stage of operation is shown. At this stage the edge of peripheral groove 65 will become aligned with port 74 and fluid will begin to pass through conduit 75 to the torque converter. The pressure of the fluid at this time will depend largely upon engine speed and the pressure of spring 57 opposing the fluid pressure acting against end 68 of plunger 51. As the engine speed increases, the pressure in the output of pump 15 likewise increases thereby increasing the pressure behind plunger 51 and causing the plunger to continue in its movement to the right as viewed in Figs. 1 and 3.

The next position assumed by the valve is shown in Fig. 4. In this position the edge of peripheral groove 65 has completely passed over port 69 so that plunger 51 now covers port 69 and prevents further passage of fluid from port 49 and its connected pump 15 into passage 70 and into the valve bore 28. With the elimination of fluid pressure behind plunger 27, the output pressure of the pump acting through bleed opening 24 to oppose spring 25 then drops to the pressure as established by spring 25. The load on the pump and the power required to drive the pump is thus reduced to a comparatively low value. The output pressure of pump 15 will not drop to zero, however, since spring 25 will oppose the pump pressure and will stabilize the pressure at the spring pressure which, of course, is lower than the operating pressure in the system.

At this stage it is assumed that the vehicle is in motion and the pump 16 thereby is in operation. With the reduction of pressure from pump 15, a differential pressure will be established on plunger 32 in the direction of moving the plunger to close port 41 and open port 45. It will be recalled that under these conditions stem 40 abuts on end wall 42 of block 34 so that the position of the valve is definitely determined with respect to ports 41 and 45. With port 41 closed, pressure from pump 16 may then pass through check valve 32 to conduit 47 and plunger 51 will continue to operate as before.

The condition of the system when rear pump 16 takes over is shown in Fig. 2.

Check valve 32 is shown in its left hand position in which port 41 is blocked and port 45 is unblocked. Pump selector valve plunger 51 is shown in Fig. 2 with the edge of a peripheral groove 80 in plunger 51 aligned with the edge of port 69. In the position shown in Fig. 4 the fluid in the bore 28 of pump pressure regulating valve 20 is trapped and remains constant, except for the overflow past land 21 into groove 28. In the position shown in Fig. 2, with the edge of peripheral groove 80 aligned with port 69, the trapped fluid may then escape through conduit 70 and port 69 around peripheral groove 80 to port 76 which, as noted above, is connected to the sump. Thus in the position shown in Fig. 2, the pressure formerly assisting spring 25 is vented and, hence, the pump pressure regulating valve 20 assumes a position shown in Fig. 2; that is, with the output of the pump being fed back to the sump or to the input to the pump so that the load on the pump is reduced to that required to overcome spring 25 only.

Referring to Fig. 4 again, it will be noted that the end 64 of plunger 51 has been previously contacted by the end 63 of sleeve 60 which in turn is in contact with spring 58. At the time of this previous contact the spring loading on plunger 51 was thus brought up to the full pump pressure value which is maintained through any further movement to the right of plunger 51. Thus, further movement of plunger 51 to the right, as viewed in Fig. 4, can only take place when the fluid pressure behind end 68 of plunger 51 is sufficiently high to overcome both spring 57 and spring 58. In terms of pressure, this means that the pressure in any member connected to plunger 51 will increase to whatever value springs 57 and 58 are set. It is contemplated that pump 15 will be rendered ineffective prior to the building up of the pressure required to overcome springs 57 and 58 and that the requisite pressure will be supplied by pump 16.

Assuming that pump 16 is in operation and is being driven at a variable speed in accordance with the speed of the vehicle, its output pressure will likewise vary and, consequently, may reach a value which may be excessive for the devices controlled by the fluid system. To regulate the output pressure of pump 16, port 72 is so located that the edge of peripheral groove 65 will be aligned with the edge of port 72 when the sum of spring pressures 57 and 58 will be equal to the maximum pressure desired in the system. This condition is shown in Fig. 5.

It will thus be observed that plunger 51 performs a number of important functions, among which are: (1) Flow into converter at reduced pressure due to pump selector valve being under influence of inner spring only at this time, this lowered pressure being for the purpose of securing oil flow through the converter under limited front pump capacity under engine idling conditions. (2) Pick up of outer spring and establishing of proper operating pressure through valve 69 and lead back lines 70 and 71 to spring side of piston. (3) To relieve pressure behind valve 20 to permit front pump to idle when rear pump delivers enough oil to satisfy the system. (4) Blow-off means for rear pump when its capacity exceeds demands of system.

The various hydraulically operated devices of the transmission such as the servomotors for the brakes and clutches are connected to pressure line 47 through a passageway 81 and suitable control valves (not shown), and the pressure in passageway 81 may be further modified as desired and as shown in my co-pending application, Serial No. 71,128, filed January 15, 1949.

For reverse drive, the reaction produced by the gearing in the aforesaid co-pending application is considerably higher than the reaction for low gear drive and hence the fluid pressure required to apply the brake band is accordingly higher. This increased pressure is obtained by conducting the operating fluid under pressure from servomotor 78 through conduit 78 to port 77, the operating fluid being directed to servomotor 79 from passageway 81 through suitable control valves as aforesaid. The operating fluid so conducted will balance out the pressure acting against end 68 of plunger 51 and hence will result in a higher pressure in the system and particularly in servomotor 79.

What is claimed is:

1. A control system for a fluid operated variable speed power transmitting device having a pump driven from the power input member of the device and a pump driven from the power output member of the device, said system comprising a check valve, means connecting one side of the check valve to the output of one pump and the other side of said check valve to the output of the other pump, and a pump selector valve connected to the output of the check valve, said pump selector valve having a plunger, spring means urging the plunger in one direction, and means for conducting the output of the check valve to the side of the plunger opposite the spring to oppose the action of the spring, said pump selector valve having output ports adapted to be successively connected to or disconnected from the output of the check valve by the plunger, one of said ports being a vent port and serving to limit the maximum pressure produced in the system.

2. A control system as described in claim 1, said system including a pressure regulating valve for the input member driven pump, means to connect said pressure regulating valve to said vent port of the pump selector valve when the output member pump reaches its normal operating pressure whereby to cause said input member pump to operate at a minimum pressure.

3. A control system as described in claim 1, said system including a pressure regulating valve for the input member driven pump, said pressure regulating valve including a plunger having a peripheral groove aligned at all times with the output of said input member driven pump, one side of the plunger being in hydraulic communication at all times with the groove such that the plunger is urged in one direction by the output pressure of said input member driven pump, said plunger being movable to a position in said one direction wherein the output of said input member driven pump is vented, one of the ports in said selector valve connecting the output of the check valve to the opposite side of said plunger to balance the hydraulic pressure on the plunger, and spring means serving to hold the plunger in its unvented position initially and while the pressure on both sides of the plunger is balanced.

4. A control system as described in claim 1, said plunger spring means of said selector valve including one spring continuously opposing movement of the plunger over the operating range thereof, and a second spring, said second spring being positioned to be contacted by the plunger at a predetermined position substantially at the end of the range of movement of said plunger and preventing further movement of the plunger until a substantially greater pressure is produced in the output of the check valve.

5. A control system for a fluid operated variable speed power transmitting device, a pump in said system driven from the power input member of the device, and a pump in said system driven from the power output member of the device, a pressure regulating valve means in said system, means for connecting said valve means to the output of the power input member pump, and means for connecting the valve means to the output of the pump driven from the power output member, said valve means including hydraulically actuated means sensitive to pressure supplied by the power output member pump, a vent port in said regulating valve, said hydraulically actuated means uncovering said port when said pressure reaches a predetermined degree to cause said input member pump to idle when the pump driven from the power output member is supplying fluid at a predetermined pressure.

6. A control system for a fluid operated variable speed power transmitting device having a pump driven from the power input member of the device and a pump driven from the power output member of the device, said system comprising a pressure regulating valve having a plunger controlling the output of the power input pump and adapted in one position to vent the said power input pump, fluid means urging the plunger to its venting position, fluid means opposing the first-mentioned fluid means, and valve means controlled by the power output pump for rendering ineffective the opposing fluid means.

7. A control system for a fluid operated variable speed power transmitting device having a pump driven from the power input member of the device; said system comprising a pressure regulating valve including a plunger controlling the output of the power input pump and adapted in one position to vent the said power input pump, fluid means urging the plunger to its venting position, resilient means opposing the said fluid means such that the fluid pressure produced by the power input pump is limited to a predetermined value, and a pressure regulating and controlling valve connected to the output of the power input pump, said pressure regulating and controlling valve being connected to supply fluid under pressure to the first pressure regulating valve in opposition to the fluid means urging the plunger to its venting position, whereby to enable the said power input pump to suply fluid under high pressure to the system.

8. A control system for a fluid operated variable speed power transmitting device having a pump driven from the power input member and a pump driven from the power output member of the device; said system comprising a pressure regulating valve including a plunger controlling the output of the power input pump and adapted in one position to vent the said power input pump, fluid means urging the plunger to its venting position, resilient means opposing the said fluid means such that the fluid pressure produced by the power input pump is limited to a predetermined value, a check valve having a plunger, a conduit connecting the output of one pump to one side of the plunger and a conduit connecting the output of the other pump to the other side of the plunger, said plunger being movable in response to differential pressure produced on its sides by the said pumps; outlet ports in said check valve having a common output conduit, one outlet port being connected through the valve to the output of one pump and another outlet port being connected through the valve to the output of the other pump, said check valve plunger in one position closing one outlet port without closing the valve to the output of the associated pump, and a pressure regulating and controlling valve connected to the common output conduit, said last-mentioned pressure regulating and controlling valve being connected to supply fluid under pressure to the first pressure regulating valve in opposition to the fluid means urging the plunger to its venting position, whereby to enable the said power input pump to continue to supply fluid under pressure to the system.

9. A control system as described in claim 8, said last-mentioned pressure regulating and controlling valve being adapted in one position to cut off the supply of fluid under pressure to the first pressure regulating valve in opposition to the fluid means as aforesaid, whereby fluid pressure in the output of said power input pump drops to its minimum value and said check valve is moved to admit fluid under pressure from the power output pump to the common output conduit.

10. A control system for a fluid operated variable speed power transmitting device having a pump driven from the power input member of the device and a pump driven from the power output member of the device, said system comprising a pressure regulating valve connected to said pumps and having an input port and a plurality of output ports including a vent port, a plunger in said valve adapted to connect the input port successively to the output ports, said input port being connected to one side of said plunger to urge the plunger in one direction with a force proportional to the fluid pressure in said input port, resilient means opposing the fluid pressure acting on the plunger to establish one range of fluid pressures in the system as the plunger is moved by said fluid pressure, and other resilient means opposing the fluid pressure acting on the plunger and contacted by said plunger to establish a second range of fluid pressures in the system.

11. A control system as described in claim 10, a pressure regulating valve connected to the output of one of the pumps and adapted to produce a maximum pressure which is less than the minimum required by the system, a conduit connecting one of the output ports to the said pump pressure regulating valve to admit fluid pressure to the pump pressure regulating valve in opposition to the pressure to be regulated to render the said pump pressure regulating valve ineffective to regulate pressure, and means for transferring the input of the pressure regulating valve from one pump to the other, said means being responsive to the difference in pressure produced by the two pumps, one of said outlet ports serving to vent the fluid pressure admitted to the pump pressure regulating valve to render the said pump pressure regulating valve effective, whereby the difference in pressure produced by the two pumps may favor the output member pump and cause said means to transfer the input to the pressure regulating valve to the said output member pump.

12. A control system as described in claim 10, and means for introducing fluid under pressure to the side of the plunger on which the resilient means acts to establish a third range of pressures in the system.

13. a pressure regulating valve comprising a valve body having a bore and a plurality of ports therein including an inlet port, a plunger in said bore, said plunger having two peripheral grooves, one of said grooves in one position of the plunger being aligned with the inlet port and with an outlet port and the other of said grooves being aligned with a vent port and an inlet port, said plunger having cross bores connected to one groove and an axial bore connecting the cross bores with the end of the plunger such that fluid under pressure entering the groove will pass through the cross bores and axial bore to the end of the plunger to urge the plunger in one direction in the valve body bore, a tube secured to the end of the plunger opposite the end having the axial bore, a spring in the tube compressed between the tube and the valve body and opposing the fluid pressure, and a second spring in the bore disposed concentrically with respect to the first-mentioned spring and compressed between the end of the bore and an abutment in the bore, said plunger being adapted to exert pressure against the second spring after the first-mentioned spring has been compressed a predetermined amount, whereby to provide two ranges of pressures in the output of the valve.

14. A pressure regulating valve as described in claim 13, and a sleeve interposed between the plunger and said second spring to transmit the pressure of the plunger to said second spring, said sleeve having a flange at one end and said valve body bore having an abutment contacted by the flange to limit movement of the sleeve in the bore under the action of the said second spring.

References Cited in the file of this patent

UNITED STATES PATENTS

| Number | Name | Date |
|---|---|---|
| 2,219,488 | Parker | Oct. 29, 1940 |
| 2,255,560 | Fieber et al. | Sept. 9, 1941 |
| 2,436,544 | Benham | Feb. 24, 1948 |
| 2,455,837 | Waldie | Dec. 7, 1948 |
| 2,467,508 | Trautman | Apr. 19, 1949 |
| 2,482,732 | Hollerith | Sept. 20, 1949 |